(No Model.)
H. FRASCH.
MANUFACTURE OF SODA BY THE AMMONIA PROCESS.
No. 361,355. Patented Apr. 19, 1887.
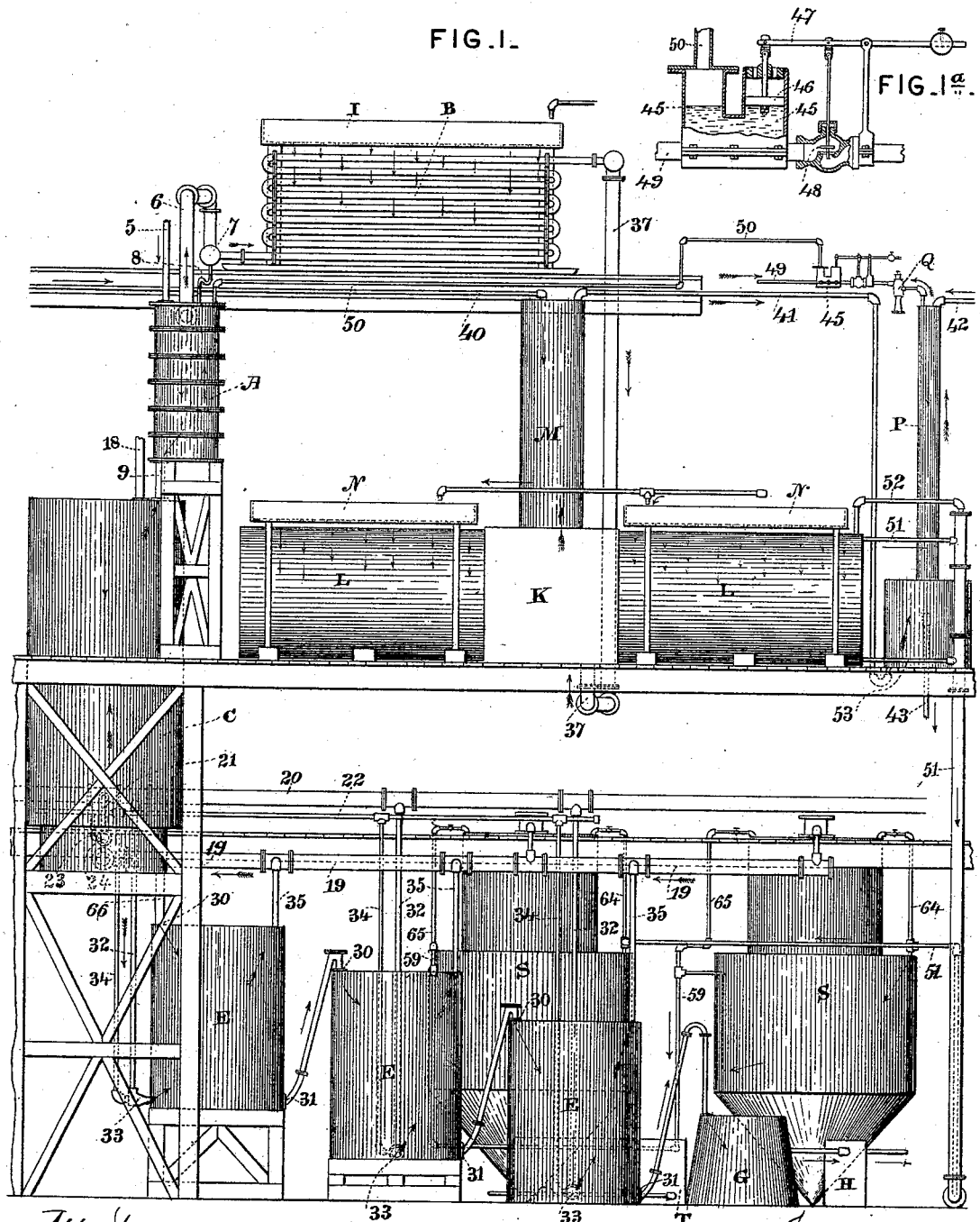

(No Model.)  5 Sheets—Sheet 2.
H. FRASCH.
MANUFACTURE OF SODA BY THE AMMONIA PROCESS.
No. 361,355. Patented Apr. 19, 1887.
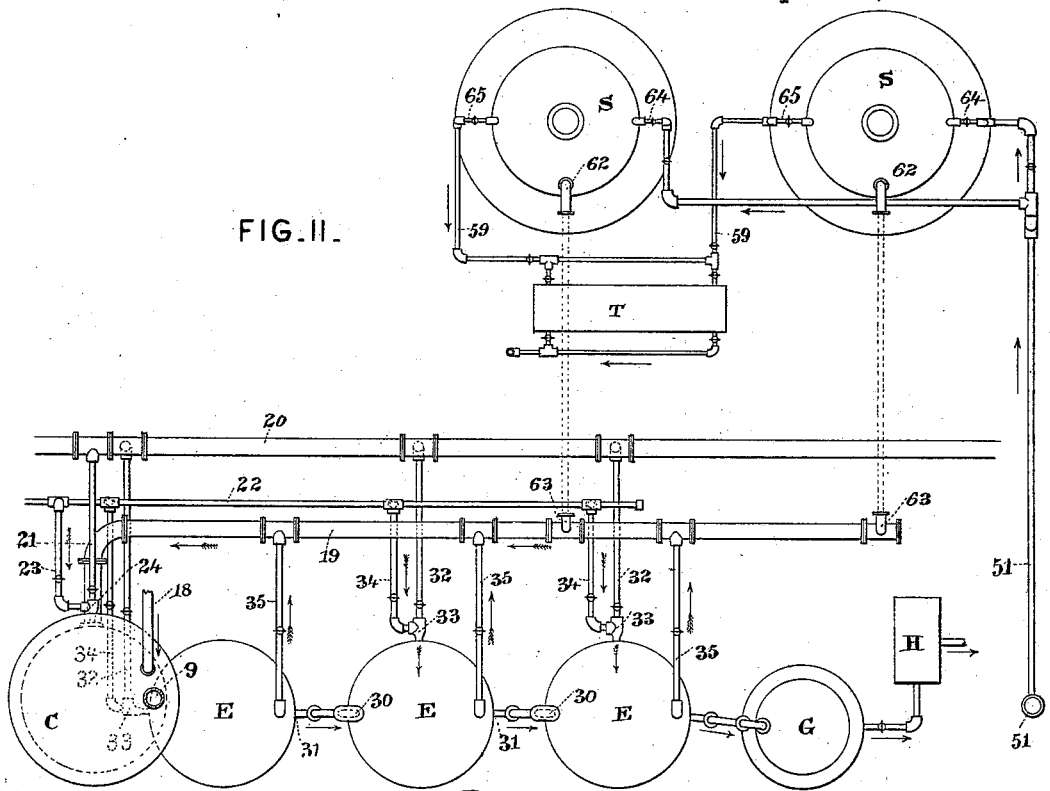
FIG. II.
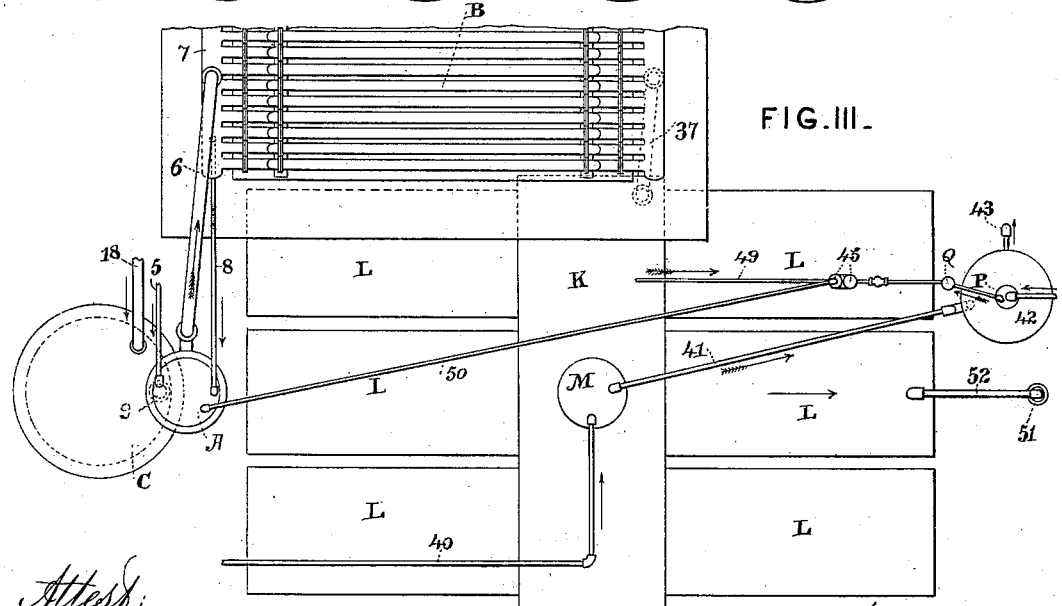
FIG. III.
Attest:
Geo. T. Smallwood.
E. C. Wurdeman.
Inventor:
Herman Frasch
By Chas. J. Hedrick
atty.

(No Model.) 5 Sheets—Sheet 3.
H. FRASCH.
MANUFACTURE OF SODA BY THE AMMONIA PROCESS.
No. 361,355. Patented Apr. 19, 1887.
FIG. IV.
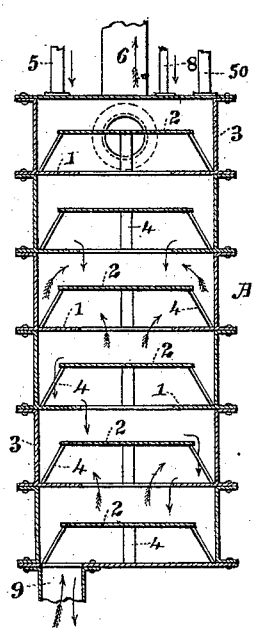
FIG. V.
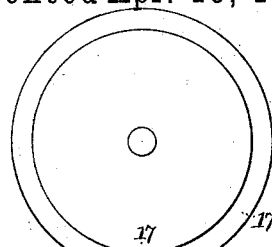
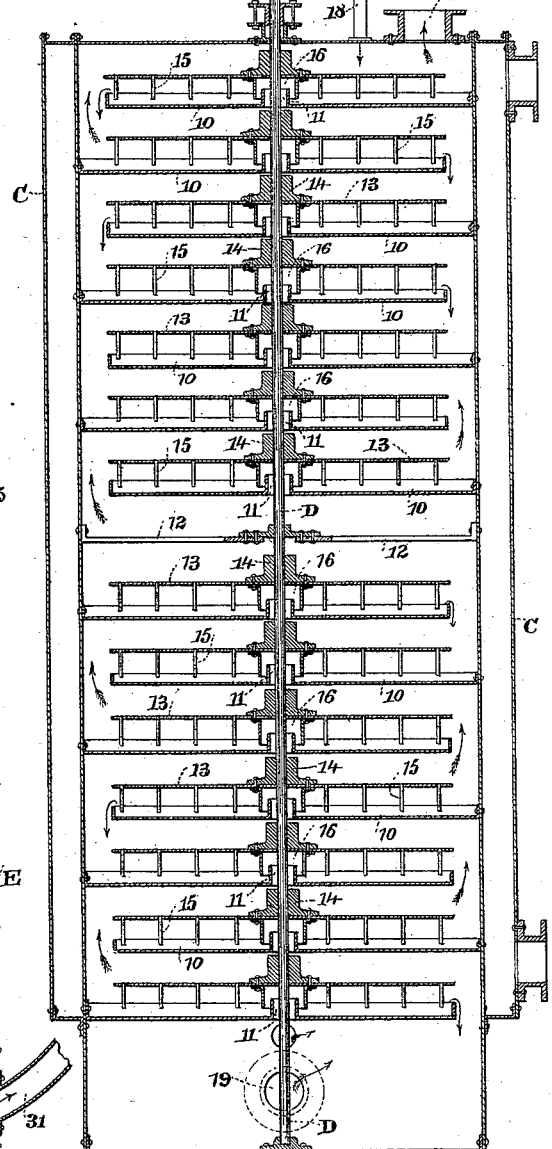
FIG. VI.
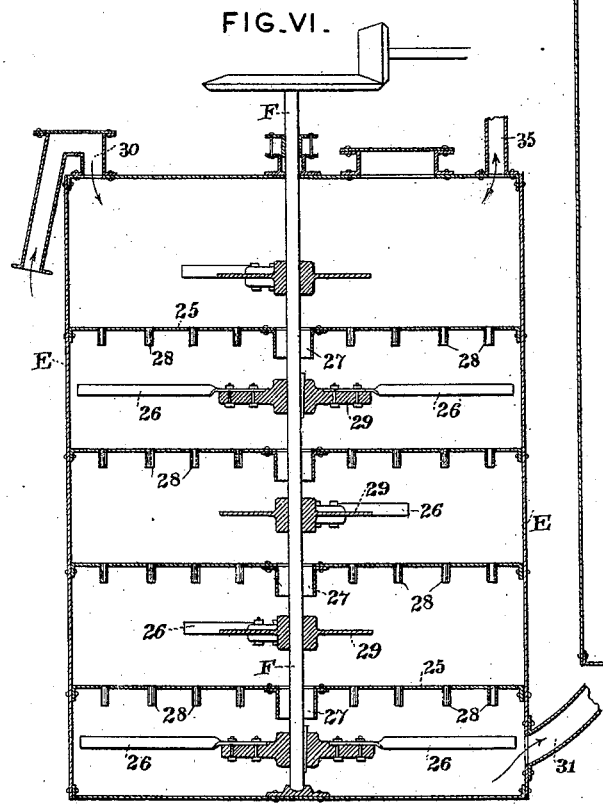
Attest: Geo. T. Smallwood. E. C. Wurdeman.
Inventor: Herman Frasch
By Chas. J. Hedrick Atty.

(No Model.)  
5 Sheets—Sheet 4.
H. FRASCH.
MANUFACTURE OF SODA BY THE AMMONIA PROCESS.
No. 361,355.  
Patented Apr. 19, 1887.
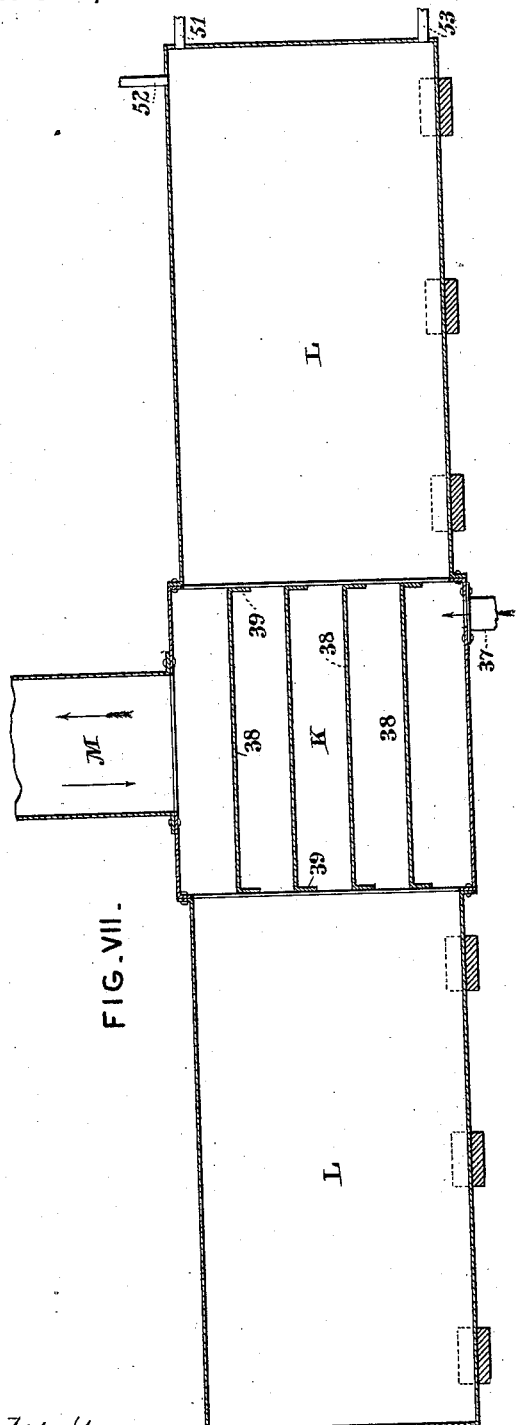
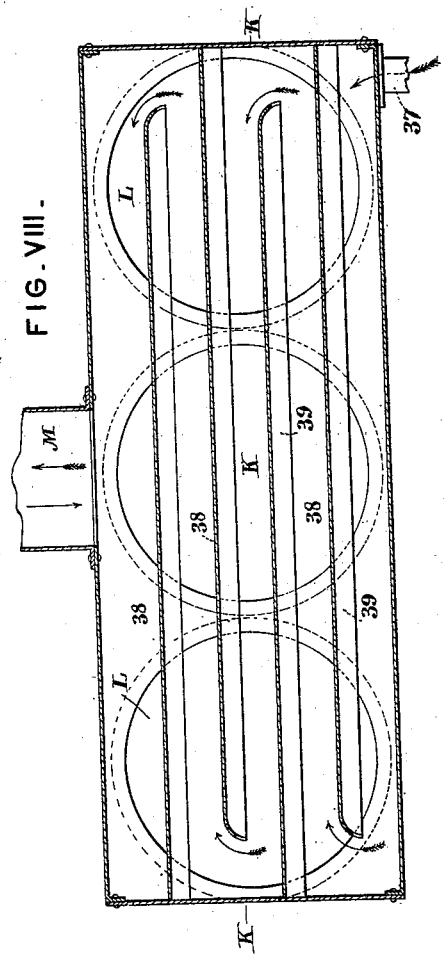
FIG. VII.
FIG. VIII.

(No Model.) 5 Sheets—Sheet 5.
H. FRASCH.
MANUFACTURE OF SODA BY THE AMMONIA PROCESS.
No. 361,355. Patented Apr. 19, 1887.
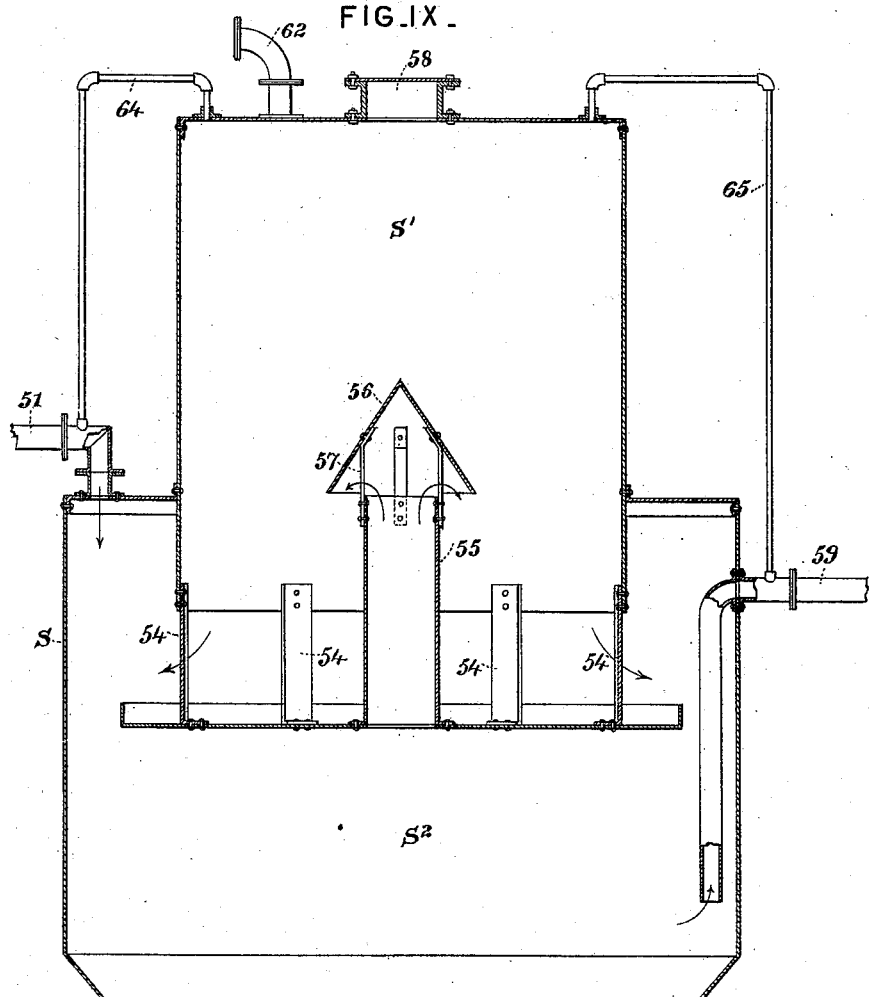
FIG. IX.

UNITED STATES PATENT OFFICE.

HERMAN FRASCH, OF LONDON, ONTARIO, CANADA.

MANUFACTURE OF SODA BY THE AMMONIA PROCESS.

SPECIFICATION forming part of Letters Patent No. 361,355, dated April 19, 1887.

Application filed May 5, 1886. Serial No. 201,165. (No model.)

*To all whom it may concern:*

Be it known that I, HERMAN FRASCH, a citizen of the United States, residing at London, in the Province of Ontario, Canada, have invented certain new and useful Improvements in the Manufacture of Soda by the Ammonia Process, of which the following specification is a full, clear, and exact description.

This invention relates to the manufacture of soda (sodium carbonate) by decomposing common salt (sodium chloride) in solution with ammonia and carbonic acid, separating the sodium bicarbonate thus produced from the liquid, and roasting it to form the monocarbonate of sodium.

In this manufacture as ordinarily practiced the ammonium chloride which results from the decomposition of the common salt is subsequently decomposed by heating the solution thereof with milk of lime, the ammonia which is distilled off is absorbed by fresh brine preparatory to treatment with carbonic acid, and the brine which is thus ammoniated is made to dissolve a fresh quantity of common salt, in order to give it the proper salt strength.

The present invention has particular reference to the preparation of the ammoniated brine, and includes new methods of and apparatus for effecting distillation of the ammonium-chloride solution with milk of lime, the absorption of the ammonia in fresh brine, and the restoration of the salt strength of the brine after the absorbing operation.

The invention consists, mainly, in the following improvements:

First. In effecting the decomposition of the ammonium chloride and distillation of the ammonia, it is highly desirable to have a very large current of steam flowing through the apparatus. To obtain this in the most economical manner, exhaust-steam from the various steam-pumps for compressing the carbonic acid and from other convenient apparatus is utilized, and it is energized by live steam introduced through one or more injectors, so that it may be forced through the still without producing back-pressure upon the pumps or other apparatus. This arrangement or combination has the further advantage that it avoids danger of explosion from excessive steam-pressure in the still, for, the force of the injector being just great enough to lift the column of liquid and overcome the normal resistance of the still, should clogging occur, the entrance of steam into the still is arrested, the pressure rises somewhat in the pipes conveying the exhaust-steam, and, as these pipes are or may be open at the compressors, a dangerous rise of pressure is impossible. This advantage is an important one, because the size and peculiar construction of this kind of still prevent their being built of sufficient strength to withstand pressure like a steam-generator. Safety-valves cannot be relied upon, in consequence of their liability to stick.

Second. Two kinds of still-column, each divided into numerous compartments or chambers, are employed in series. In one the vapors come repeatedly into contact with the liquid as a shower or spray; in the other the vapors rise through a body of the liquid. The ammonium-chloride solution mixed with milk of lime is first acted upon in former column, and afterward passes into the latter, wherein the distillation is completed.

Third. In each kind of column stirrers are employed in the several chambers to prevent the deposit of lime and to mix together all parts of the liquid therein.

Fourth. The column of the first kind consists of a series of trays or shallow pans placed one above the other and arranged so that the vapors pass in a zigzag manner over and between them, and the liquid drips from one to the next below successively; and the stirrers are formed by a series of pins depending from a disk, or a series of arms projecting horizontally from the rotating stirrer-shaft. These pins dip into the liquid in the trays or pans and impart sufficient rotation thereto to prevent deposit of lime. The vapors are prevented from passing up alongside the shaft by inverted cups sealed by dipping into the liquid in the trays.

Fifth. Each column of the second kind is divided into a succession of chambers by horizontal partitions, and at the top of each chamber a vapor-space is formed, preferably by means of short tubes, which depend from the partitions, and through which the chambers communicate. In this way the ammonia can separate from the liquid in each chamber, and after it has once become vaporized it is not apt to become reabsorbed in the hot liquid. It will of course be understood that the vapors continually pass from the lower to the next higher chambers through the tubes and that the liquid passes in the opposite direction.

Sixth. To effect the most complete liberation of the ammonia a number of columns are connected in series, so that the liquid flows through them successively, but are supplied with steam and have the vapors taken off individually. Thus the same liquid is successively treated with fresh steam. This arrangement has also the advantage, particularly when the columns are so constructed that the vapors pass through the liquid, that the pressure requisite to force the vapors through the columns is diminished. It also allows a number of these columns to be placed alongside each other with only a small difference in level between them.

Seventh. What is considered the best arrangement is a number of columns provided with means for passing the vapors through the liquid and connected as last described, in connection with a column in which they pass over the surface of the liquid and through a shower or spray of the same, this latter column receiving the vapors from all the other columns (as well as a fresh supply of steam, if desired) and supplying the ammoniacal liquor to the same.

Eighth. It is very desirable to avoid excessive pressure in the still, as this is apt to produce a loss of ammonia by leakage, and it is also desirable to prevent a vacuum forming, which might induce an ingress of air. An automatic regulation is secured by means of a governor controlled by the pressure in the still and regulating the power of an aspirator, such as an ejector or a pump. Such a regulator could be used to maintain any desired pressure; but ordinarily the power of the aspirator would be adjusted simply to overcome the resistance of the apparatus interposed between the still and the aspirator and to maintain the atmospheric pressure. The apparatus interposed between the still and the aspirator consists or may consist of a condenser-coil, the ammonia-absorber, and a wash-tower, the aspirator withdrawing the uncondensed vapors and gases from the top of the tower.

Ninth. It is desirable so to absorb the ammonia in the fresh brine that the liquid will contain the right amount of ammonia to decompose the common salt which the water will hold in solution. To effect this, or to assist in effecting it, the ammonia is brought in contact with a part only of the brine in the absorber or absorption apparatus, in which a very large body of brine is maintained, so that if the supply of ammonia be irregular the solutions of different strength will mix and form one of an average strength. This mode of absorbing is also advantageous in keeping the temperature low in the absorber. The ammonia in passing through the absorber is kept in contact with the liquid, so as to be absorbed as completely as possible.

Tenth. The absorber employed to effect the absorption in the manner just described consists, essentially, of a mixing-chamber, in which the ammonia is brought into contact with the brine, and one or more reservoirs communicating with the mixing-chambers. These reservoirs are preferably cylindrical vessels extending laterally from both sides of the mixing-chamber. They are or may be cooled by showering cold water over them, or in other suitable ways. The mixing-chamber is preferably elongated, so that the height, and consequently the pressure requisite to force the liquid through it, may be reduced. It is provided with a series of arresting-plates for stopping the upward motion of the ammonia vapor, and they are so arranged that the vapor is obliged to flow lengthwise of the same before it can escape therefrom and rise to the plate above. The ammonia thus passes over a large body of brine and is retained in contact therewith a sufficient time to effect its absorption. The arresting-plates are provided with depending flanges at the sides for preventing the escape of the ammonia into the reservoirs. The mixing-chamber is or may be surmounted by a tower, (filled with broken stone, or provided with other means for bringing a liquid and a gas in contact,) down which the incoming brine flows, and in which it is brought into contact with the ammonia not absorbed in the mixing-chamber. The vapors which escape from this tower are or may be condensed by pure water in a separate wash-tower.

Eleventh. In passing through the absorber the brine takes up more or less water which escapes with the ammonia from the still, and its salt strength, reduced by this dilution, is restored by running the ammoniated brine into a vessel in which a body of salt is supported near the upper end thereof. This salt is dissolved by the brine. The apparatus can easily be constructed to expose more or less of the solid salt to the action of the brine, so that the proper quantity will be dissolved. As the brine is hot when it enters the salt-vessel, it should not be allowed to become saturated, because it would, when afterward cooled, not retain all the salt in solution, and an undesirable deposit would be the result.

Twelfth. The salt-chamber is provided with an outlet some distance from the bottom, so as to leave a settling-chamber below, in which impurities may collect, and also, at a suitable distance from the top, so as to take off the heavy brine whose salt strength has been restored.

Thirteenth. Means are provided for steaming the salt-vessel, so as to remove any crust which may form inside. The impurities which collect in the bottom of said vessel are drawn off from time to time. Preferably there are two salt-vessels, so that one can be used when the other is cleaning.

After the salt strength of the ammoniated brine has been restored, it is ready for treatment with carbonic acid in any ordinary or suitable way. It should be understood, however, that it is not essential to the present invention that no carbonation of the brine should be effected until the ammoniation is complete, although it is preferred wholly to defer the carbonation until that is accomplished. The manner of effecting the carbonation does not enter into the invention.

The invention comprises, in addition to the main improvements mentioned, certain special constructions, combinations, and arrangements of parts, as hereinafter explained.

The following is a description of what is considered the best mode of applying the principle of the invention, reference being had to the accompanying drawings, which form a part of this specification.

Figure I is an elevation of an apparatus constructed in accordance with the invention, (the stirrers and means for operating them being omitted for simplicity of illustration;) Fig. I$^a$, an elevation, partly in section, showing the pressure-governor in detail; Fig. II, a plan of that portion of the apparatus in the first or lowest floor; Fig. III, a similar plan of the portion on the upper floors, a part of the coil being broken away and the sprinklers being omitted; Fig. IV, a central vertical section of the small column above the main still; Figs. V and VI, similar views of the two kinds of columns forming the main still; Figs. VII and VIII, vertical sections in planes at right angles to each other of the absorber, (omitting the tower;) and Fig. IX, a vertical section of one of the salt-vessels.

In these figures the flow of gas or vapor is indicated by feathered arrows; that of liquid by unfeathered ones.

The column A, Figs. I, III, and IV, is provided on the inside with a series of alternating rings, 1, and disks 2, the rings, as shown, being cast on the tubular sections 3, which make up the column, and the disks being supported by legs 4, which rest upon the rings. The column is or may be provided with any ordinary or suitable means for cooling it, such as a water-jacket or pipes for delivering water against its outer surface. The ammonium-chloride solution enters by the liquid-inlet pipe 5, the ammoniacal vapors pass off by the large vapor-outlet pipe 6, which conveys the vapors into the manifold 7 at the lower part of the condenser-coil B. The liquid condensed in this coil is returned to the column A by the small pipe 8, which is provided with a trap to prevent the passage of vapors through it. The vapors enter and the liquid escapes from the column by the pipe 9, which establishes a free communication with the still-column C. This column, Figs. I, II, III, and V, is provided inside with a series of trays or shallow pans, 10, so arranged that the vapors and liquid pursue a zigzag course. Each tray forms a partition, through which there is a passage at one side, and in adjacent trays this passage is at opposite sides. In the center of the column is the rotary stirrer-shaft D, which is supported by a step at the bottom, a bearing in the cross-beam 12 in the middle, and a stuffing-box at the top. The central hole in each tray is surrounded by a short upright tube, 11, to prevent the liquid from passing through it. Above each of the trays the shaft is provided with radial arms, or a disk, 13, attached to a hub, 14, on the shaft, and provided with depending pins 15 of sufficient length to enter the liquid in the trays and keep it in constant motion. The shaft passes through holes in the center of the trays, and the vapors are prevented from taking that path by the inverted cups formed by the hubs 14 and collars 16, (bolted to the hubs,) which dip below the surface of the liquid, and thus form each a trap. The shaft D is revolved slowly by bevel-gears 17. The milk of lime enters the column C by the pipe 18. It is prepared and supplied in any ordinary or suitable way. The column is shown provided with a jacket for steam or other fluid for regulating its temperature, or to serve simply as a non-conducting envelope; but it is not necessary to use a jacket nor any equivalent for it. The vapors from the lower series of columns, E, enter the column C by the pipe 19. Exhaust-steam from the main 20 is delivered through the branch pipe 21, and is energized by live steam from main 22, supplied by the branch pipe 23 to the injector 24, interposed between the branch pipe 21 and the still-column.

The columns E, Figs. I, II, and VI, are alike, and are each divided by perforated diaphragms 25 into a series of chambers, and provided with a vertical shaft, F, carrying stirrers 26 in each chamber or compartment. The shaft turns in a step at the bottom and a stuffing-box at the top, and is rotated by bevel-gears. The hole in the center of each diaphragm is provided with a depending collar, 27, which dips into the liquid below, and thus seals the opening. Each diaphragm has a short tube, 28, screwed into each perforation therein, and thus a vapor-space, whose depth equals the length of the depending portion of the tube is formed in the top of each compartment. When the space becomes full, the vapor escapes and rises through the liquid in the compartment above. The stirrers are attached to disks 29, which are keyed to the shaft F. The disks prevent the liquid descending straight through the openings of collars 27, and cause it to pass outward toward the circumference. The liquid-inlet 30 is at the top of the column and the outlet 31 at the bottom. Exhaust-steam is taken from the main 20 by branch pipe 32 and forced into the bottom of each column by means of live steam supplied to an injector, 33, by branch pipe 34. Each column has its individual steam-supply pipes and injector, and these are provided with suitable cocks or valves. The vapors escape from each column by its individual branch pipe 35, which delivers them into the vapor-pipe 19, by which the vapors from all the columns are delivered into the bottom of column C.

The columns E are connected in series, so far as the flow of liquid is concerned, the liquid-outlet 31 of one column being connected with the liquid-inlet 30 of the succeeding column. They are placed at different levels, so that the liquid will flow by gravity from one to the other. From the last column the liquid, now a solution of calcium chloride, enters the waste-reservoir G, and is then delivered by the pump H wherever desired. Ordinarily it would be allowed to run to waste.

The ammoniacal vapors from the column A enter the condenser-coil B, as already explained. They enter the bottom, so that the condensed liquid will flow through the coil in the opposite direction to the vapors. A very large coil is used, because of the large quantity of steam introduced into the still. It is cooled by any ordinary or suitable means. A sprinkler, I, for that purpose is shown in Fig. I. From the condenser-coil the vapors sufficiently free from water pass by the pipe 37 into the bottom of the absorber. This apparatus, Figs. I, III, VII, and VIII, consists of a central mixing-chamber, K, lateral reservoirs L, and a tower, M. The mixing-chamber K and the lateral reservoirs L are kept full of brine to the level of the pipe 51, by which the ammoniated brine flows out. The mixing-chamber in which the ammonia vapor is brought into contact with the fresh brine has its interior divided by partitions 38, extending alternately from each end to within a short distance of the opposite end. Thus the vapors which enter at one end of the mixing-chamber rise till they meet the lowest of the arresting-plates 38, and are compelled to travel the length thereof before they are allowed to escape and rise to the plate above. Thus the vapors pursue a zigzag course through the chamber favorable to their absorption. Depending flanges 39, at the sides of the partitions or plates 38, prevent the vapor escaping in that direction.

The reservoirs L are each in the form of a cylindrical boiler, and are in free communication with the mixing-chamber. Suitable means are provided for cooling them—a sprinkler, N, for each reservoir, for example. The vapors not absorbed in the mixing-chamber pass up the tower M, which may be filled with broken stone or coke, or may have other suitable means for securing contact between vapors and liquids. The vapors therein meet the current of fresh brine, which is introduced through the pipe 40. The vapors escape by the pipe 41 and enter the bottom of the wash-tower P, of any ordinary or suitable description, which is supplied with wash-water by the pipe 42. The wash-water escapes by the pipe 43. At the top of the tower P is a steam-jet aspirator or ejector, Q, which induces the flow of ammoniacal vapors through the condenser B, absorber K M, and wash-tower P without necessitating a pressure above that of the atmosphere in the columns A C or condenser B. It will of course be understood that there will be a difference of pressure between the upper compartments of columns E and the exit of condenser B; but as the apparatus are in free communication with each other this difference would naturally be small.

To regulate automatically the power of the aspirator Q, a governor, R, actuated by any variation of pressure in the still-columns, is employed to control the supply of steam to the aspirator. Any suitable governor may be used. As shown, there are two chambers, 45, in free communication with each other at the bottom and filled about two-thirds full with paraffine-oil or other suitable liquid, which will not dry or saponify or be altered by the ammoniacal vapor, a piston, 46, in one of the chambers, having a piston-rod which is guided by a perforated screw-cap at the top of the chamber, a counterbalance-lever, 47, connected with the piston-rod by a link, and a valve, 48, having its stem connected by a link with the lever 47, so that it and the piston 46 move up and down together. The valve 48 is placed in the steam-pipe 49, which supplies the aspirator Q, and the governor is supported on said pipe. The chamber 45, which has no piston and forms the pressure-chamber of the governor, is closed to the atmosphere, but is connected by a pipe, 50, with the interior of column A, so that the pressure in said column is communicated through said pipe to the surface of the oil in said chamber. The parts are preferably so adjusted that when atmospheric pressure exists in the columns A C, equilibrium is established. Any increase in pressure tends to transfer the oil to the piston-chamber, and consequently to raise the piston 46 and valve 48, and to increase the supply of steam to the aspirator Q until equilibrium is again established. Any decrease in pressure permits the piston 46 to fall and the valve 48 to close, thereby cutting off the supply of steam to the aspirator and diminishing its power. This governor could be arranged to maintain any desired pressure; but preferably it is adjusted to maintain atmospheric pressure in the columns A C, as stated.

From the absorber the ammoniated brine passes, by the pipe 51, into one or both of the salt-vessels S, Figs. I, II, and IX. The descending part of pipe 51 is made of large bore, in order that any vapors which separate can pass readily back into the absorber. A pipe, 52, is provided for allowing them to return without interfering with the outflow of brine. A pipe, 53, ordinarily closed by a cock, is provided for emptying the absorber when desired.

The salt-vessels S, Fig. IX, consist of the salt-reservoir S' at the top and the brine-chamber $S^2$ in the middle and the sediment-chamber $S^3$ at the bottom. The salt-reservoir has the bottom supported by strips 54, leaving free spaces between, and the bottom extends beyond the strips a sufficient distance to prevent the salt from falling down over its edge. It is provided with a central tube, 55, and a cap, 56, supported above the same by strips 57, so as to allow a circulation to take place through the lower part of the body of salt in the reservoir; but this tube and its accessories may be omitted, and reliance had simply upon the immersion of the salt in the liquid. When the tube 55 is used, the salt-chamber has inlet and outlet openings at different levels—namely, an inlet-opening at the top of tube 55 and an outlet at the periphery of the bottom of the salt-chamber. The saturated brine in the salt-chamber being heavier than the unsaturated brine in the tube 55 a flow takes place through the salt in the salt-chamber, in virtue of the difference in gravity. The solid salt is introduced through the hole 58, normally closed by a plate, as shown. The ammoniated brine, with its salt strength restored, is drawn off by the pipe 59, which descends below the salt-reservoir, so as to take off the heavy brine, and is connected with the pump T. Any sediment settles in the lower part of the vessel, and may be drawn off from time to time by opening the cock 60. It is desirable occasionally to steam out the salt-vessel, so as to dissolve the crust which is liable to form in the same. For this purpose a steam-pipe is temporarily attached to the tubule 61, and steam introduced as long as desired. The vapors pass off by the elbow 62, which for that purpose is temporarily connected by a pipe (represented in dotted lines, Fig. II) with a tubule, 63, of pipe 19, so that any ammonia vaporized is collected. Ordinarily the elbow 62 and tubule 63 are closed by plates. The inlet-pipe 51 and outlet-pipe 59 are each connected with the top of the salt-reservoir by a small pipe, 64 and 65, respectively, so as to equalize the pressure.

The operation is as follows: The ammonium-chloride solution, from which the bicarbonate of sodium has been separated in any ordinary or suitable way, runs by pipe 5 into the top of column A, and, flowing through the same, meets the hot vapors rising from the still-column C, by which vapors the solution is heated and any free ammonia or ammonium carbonate is separated before the solution passes by the pipe 9 into the still-column C. In the latter it meets the stream of milk of lime from pipe 18, and flows with the latter from one tray 10 to the next, passing in showers through the ascending hot vapors. The two solutions are mixed and the lime kept in suspension by the stirrers 15. The mixed liquor flows from the column C, by the pipe 66, into the first column E, and thence through the others in succession, in each of which it is subjected to the action of a fresh current of steam—namely, of exhaust-steam from main 20, energized by live steam from main 22—until, by the time it escapes from the last column, the ammonia has been driven off, leaving a solution of calcium chloride, to run to waste or to be dealt with in any desired manner. This separation of the ammonia from the liquid in the columns E is facilitated by the vapor-space formed by the depending tubes 28 at the top of each compartment, which permits a separation to take place, and then the heat prevents a reabsorption. The vapors which pass from the columns E separately by the pipes 35 unite in the pipe 19 and enter the bottom of column C in one volume. This large body of vapor, passing through the column C, assists in carrying off the ammonia set free therein, and in preventing a reabsorption of the same. The vapors from column C enter column A by the pipe 9, and after passing through column A enter the coil B, by which most of the steam or water vapor is condensed, leaving ammonia to pass by pipe 37 into the mixing-chamber K of the absorber. In this chamber it meets the brine, (prepared or purified in any suitably manner and introduced into tower M by pipe 40,) and, in passing through the mixing-chamber K and tower M, is absorbed by it. The small portion not absorbed passes on by pipe 41 to the wash-tower P, where it is taken up by the water with which the tower is supplied. The current of the ammonia is maintained with atmospheric pressure in the still by the aspirator Q. The very large volume of brine in the absorber insures a supply of brine ammoniated to a proper degree, and it also materially assists in keeping down the temperature in the absorber. From the absorber the ammoniated brine passes through one of the salt-vessels S, where its salt strength (reduced by the water vapor which has passed from the still with the ammonia) is restored. It is then supplied to a carbonator of any ordinary or suitable construction, but preferably that described in an other application of even date herewith, and officially numbered 201,166, to be acted upon by carbonic acid for the precipitation of the bicarbonate of sodium. The solution of ammonium chloride (formed by the reaction of the carbonic acid, ammonia, and sodium chloride) is freed from the precipitated bicarbonate and run into the column A, as before described.

It is evident that modifications can be made in details without departing from the spirit of the invention, and parts of the invention may be used separately.

Having now described the invention and the manner in which the same may be carried into effect, what I claim is—

1. The improvement in recovering ammonia, consisting in injecting or mixing live steam with the exhaust-steam from pumping-engines or other apparatus and exposing the ammoniacal solution to currents of exhaust-steam so energized, substantially as described.

2. The combination, with an ammonia still or column, of the pipes for the exhaust-steam, the pipe for the live steam, and an injector for mixing them and forcing them into the column, substantially as described.

3. The combination, with a column divided by partitions or trays, forming drip-plates, and having the passages through the same alternately at different parts of the partitions or trays, so as to cause the rising vapors to pursue a zigzag course through the column and meet the descending liquid in showers or spray, of a column or series of columns divided into compartments by perforated partitions, so that the vapors may rise through the liquid, and pipes connecting the upper part of the last-mentioned column or columns with the lower part of the first mentioned, so that the ammoniacal solution passes through them successively, substantially as described.

4. The combination, with the still composed of the two kinds of columns mentioned, each divided into a number of vertical compartments or chambers, of stirrers in each, substantially as described.

5. A column composed of a series of trays overflowing one into the other and provided with mechanical stirrers dipping into the liquid in the trays, said trays having raised borders or rims at the overflow-openings, so as to form shallow pans which retain a body of liquid therein, substantially as described.

6. A column divided into compartments by horizontal partitions having each a series of openings for the passage of gas or vapor and of liquid through the same, and having also a depending tube at each of said openings, a closed vapor-space being thus formed at the top of each compartment, substantially as described.

7. A column divided into compartments by horizontal partitions having each a series of openings for the passage of gas or vapor and of liquid through the partition, and having also a depending tube at each of said openings, so that there is a closed vapor-space at the top of each compartment, in combination with stirrers in said compartments, substantially as described.

8. The combination, with a number of columns connected in series so that the liquid flows through them successively, of pipes for supplying steam to said columns individually and a separate vapor-escape pipe for each, substantially as described.

9. The improvement in recovering ammonia, consisting in passing the ammoniacal solution through a succession of vessels or columns, and in each vessel or column passing a current of steam through the solution and taking off the ammoniacal vapors separately from each vessel, so that the ammoniacal solution is subjected to a succession of distinct distillations with steam, substantially as described.

10. The combination, with a column divided by partitions or trays for causing the ammoniacal vapors to take a zigzag course through the column and a number of other columns, of liquid-conveying pipes for connecting the columns in series, so that the ammoniacal solution flows through them in succession, and vapor-conveying pipes for delivering the ammoniacal vapors into the bottom of the first-named column from each of said other columns without passing through the intermediate columns of the series, substantially as described.

11. The combination, with the still and the aspirator connected therewith, of the governor actuated by variations of the pressure in said still to control the power of said aspirator, so as to maintain a uniform pressure in the still, substantially as described.

12. The combination, with an aspirator, of an automatic governor for controlling the force of said aspirator, having the pressure-chamber of the governor in communication with the exhaust side of said aspirator, substantially as described.

13. The combination, with the still and the absorber, of the aspirator for inducing a flow of vapor from the still through the absorber, and an automatic governor, actuated by changes of the pressure in the still, for controlling the force of said aspirator and maintaining constant the pressure in the still, substantially as described.

14. The improved method of absorbing the ammonia in brine by maintaining a large body of brine in the absorbing apparatus and bringing the ammonia into contact with a part only of the said brine, substantially as described.

15. The absorber composed of the mixing-chamber and the communicating reservoirs, substantially as described.

16. The combination, with the mixing-chamber provided with arresting-plates for causing the ammonia to pursue a zigzag course through said chamber, of the communicating reservoirs, substantially as described.

17. The combination of the mixing-chambers, the communicating reservoirs, and the tower surmounting said mixing-chambers, substantially as described.

18. The improvement in the ammonia soda manufacture, consisting in restoring the salt strength of the ammoniated brine preparatory to decomposing the salt with carbonic acid by running the said brine through a vessel in which a body of salt is suspended near the upper part, substantially as described.

19. The salt-vessel comprising a salt-reservoir and a brine-chamber below the salt-reservoir, and provided with inlet and outlet pipes for the liquid, substantially as described.

20. The salt-vessel comprising a salt-reservoir and brine and sediment chambers below said reservoir, and provided with liquid inlet and outlet pipes and a draw-off for discharging the sediment, substantially as described.

21. The salt-vessel provided, in addition to the liquid inlet and outlet pipes and the openings for introducing the salt and for removing sediment, with pipes for introducing a current of steam through the said vessel, substantially as described.

22. In a salt-vessel, the salt-reservoir provided with a bottom supported by strips or rods with open spaces between for the passage of the salt, said bottom projecting beyond said rods to support the salt which falls outward between the same, substantially as described.

23. The salt-vessel having a salt-reservoir suspended within the brine-chamber and provided with openings at different levels for permitting a circulation to be maintained through the salt by the differences in gravity between the saturated brine in the salt-reservoir and the unsaturated brine outside, substantially as described.

24. The combination, with the ammonia-still and the salt-vessel, of pipes whereby a connection may be established with said still for conveying ammoniacal vapors from the salt-vessel into the same in steaming out said vessel, substantially as described.

25. The combination, with the still having columns provided with trays and stirrers and a series of columns provided with perforated partitions and stirrers, the absorber comprising a mixing-chamber and communicating reservoirs, and the salt-vessel having a salt-reservoir and a brine-chamber, of the pipes for connecting said apparatus and for conveying steam, ammonium-chloride solution, milk of lime, brine, and ammoniacal vapors, substantially as described.

26. A column composed of tubular sections fastened together and provided with alternating and overlapping rings and disks on the inside, said rings being each in one piece or casting with its corresponding tubular section, and the disks being separate metal plates supported in said sections, substantially as described.

27. A column divided by partitions, in combination with a shaft passing through openings in said partitions, and the stirrers and disks rotating with said shaft in the several compartments of the column, said disks being of larger diameter than the openings over which they are placed, and serving to deflect toward the periphery of the column the fluid which passes through said openings, substantially as described.

In testimony whereof I affix my signature in presence of two witnesses.

HERMAN FRASCH.

Witnesses:
G. W. HAMMER,
CHAS. J. SIMOND.